(12) United States Patent
Kanemitsu et al.

(10) Patent No.: US 7,609,336 B2
(45) Date of Patent: Oct. 27, 2009

(54) LIQUID CRYSTAL DISPLAY DEVICE

(75) Inventors: Akiyoshi Kanemitsu, Ehime (JP); Motohiro Yamahara, Nara (JP); Hiroyuki Kumasawa, Ehime (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 91 days.

(21) Appl. No.: 11/934,960

(22) Filed: Nov. 5, 2007

(65) Prior Publication Data
US 2008/0106679 A1    May 8, 2008

(30) Foreign Application Priority Data
Nov. 6, 2006    (JP)    ............................. 2006-300329

(51) Int. Cl.
*G02F 1/1335*    (2006.01)
(52) U.S. Cl. ..................................................... 349/64
(58) Field of Classification Search ................. 349/64
See application file for complete search history.

(56) References Cited

U.S. PATENT DOCUMENTS 4,295,712 A    10/1981    Ishiwatari
4,846,560 A    7/1989    Tsuboyama et al.
6,724,452 B1    4/2004    Takeda et al.

FOREIGN PATENT DOCUMENTS

| DE | 3631 151 A1 | 3/1987 |
|---|---|---|
| EP | 0 407 164 A2 | 1/1991 |
| JP | 2002-365636 A | 12/2002 |
| JP | 2006124522 A | 5/2006 |
| PL | 120 242 B | 6/1979 |
| PL | 382057 A | 3/2007 |

*Primary Examiner*—David Nelms
*Assistant Examiner*—Phu Vu
(74) *Attorney, Agent, or Firm*—Sughrue Mion, PLLC

(57) ABSTRACT

The present invention provides a liquid crystal display device capable of achieving natural and high-quality color display without reddish color shift, not only when viewed in the normal direction but also when viewed obliquely.

A liquid crystal display device 1 of the present invention includes a light diffuser plate 3, a light source 2 disposed on the back side of the light diffuser plate 3, and a liquid crystal panel 30 disposed on the front side of the light diffuser plate 3, wherein the light diffuser plate 3 is constituted by dispersing light diffusing particles in a transparent material, and the absolute value of a difference $\Delta n$ in the refractive index between the transparent material and the light diffusing particles and a 50% cumulative particle diameter $D_{50}$ (μm) of the light diffusing particles satisfy a relation $0.01 \leq \Delta n \times D_{50} \leq 0.25$ or $0.61 \leq \Delta n \times D_{50} \leq 0.75$.

2 Claims, 1 Drawing Sheet

LIQUID CRYSTAL DISPLAY DEVICE

BACKGROUND OF THE INVENTION

1. Technical Field

The present invention relates to a VA type liquid crystal display device capable of achieving natural color display without reddish color shift, not only when viewed in the normal direction but also when viewed obliquely.

2. Description of the Related Art

Such a liquid crystal display device has been known that employs a vertical alignment liquid crystal cell which aligns liquid crystal molecules, that are interposed between a pair of transparent electrodes, in a substantially vertical direction when not subjected to a voltage, or in a substantially horizontal direction when subjected to a voltage (refer to Japanese Unexamined Patent Publication No. 2002-365636). The liquid crystal display device that employs the vertical alignment liquid crystal cell (VA type liquid crystal cell) has advantages of high contrast and fast response.

The VA type liquid crystal display device of the prior art described above is capable of displaying with natural colors when viewed in the normal direction, although suffering from a problem of color shift with reddish tinge when viewed obliquely. As a result, high quality display cannot be obtained as the display is tinged with reddish color when viewed obliquely.

SUMMARY OF THE INVENTION

The present invention has been devised with the background described above, and has an object to provide a liquid crystal display device capable of achieving natural color display of high quality without reddish color shift, not only when viewed in the normal direction but also when viewed obliquely.

In order to achieve the object described above, the present invention provides the following means.

[1] A liquid crystal display device comprising a light diffuser plate, a light source disposed on the back side of the light diffuser plate, and a liquid crystal panel disposed on the front side of the light diffuser plate, wherein the liquid crystal panel has a liquid crystal cell constituted by interposing a liquid crystal between a pair of transparent electrodes that are disposed at a distance from each other, and the liquid crystal molecules are aligned in a direction substantially perpendicular to the transparent electrodes when no voltage is applied across the pair of transparent electrodes, the light diffuser plate is constituted by dispersing light diffusing particles in a transparent material, and an absolute value of a difference $\Delta n$ in the refractive index between the transparent material and the light diffusing particles and a 50% cumulative particle diameter $D_{50}$ (μm) of the light diffusing particles satisfy the relation $0.01 \leq \Delta n \times D_{50} \leq 0.25$.

[2] A liquid crystal display device comprising a light diffuser plate, a light source disposed on the back side of the light diffuser plate, and a liquid crystal panel disposed on the front side of the light diffuser plate, wherein the liquid crystal panel has a liquid crystal cell constituted by interposing a liquid crystal between a pair of transparent electrodes that are disposed at a distance from each other, and the liquid crystal molecules are aligned in a direction substantially perpendicular to the transparent electrodes when no voltage is applied across the pair of transparent electrodes, the light diffuser plate is constituted by dispersing light diffusing particles in a transparent material, and an absolute value of a difference $\Delta n$ in the refractive index between the transparent material and the light diffusing particles and a 50% cumulative particle diameter $D_{50}$ (μm) of the light diffusing particles satisfy the relation $0.61 \leq \Delta n \times D_{50} \leq 0.75$.

According to the invention of [1], diffused light that has transmitted through the light diffuser plate in an oblique direction is tinged with bluish color since the light diffuser plate satisfies the relation $0.01 \leq \Delta n \times D_{50} \leq 0.25$. This bluish color shift and the reddish color shift that occurs when this light is then transmitted obliquely through the VA type liquid crystal panel cancel each other. As a result, natural color display of high quality can be achieved without reddish color shift, not only when viewed in the normal direction but also when viewed obliquely.

According to the invention of [2], diffused light that has transmitted through the light diffuser plate in an oblique direction is tinged with bluish color since the light diffuser plate satisfies the relation $0.61 \leq \Delta n \times D_{50} \leq 0.75$. This bluish color shift and the reddish color shift that occurs when this light is then transmitted obliquely through the VA type liquid crystal panel cancel each other. As a result, natural color display of high quality can be achieved without reddish color shift, not only when viewed in the normal direction but also when viewed obliquely.

BRIEF DESCRIPTION OF THE REFERENCE SYMBOLS

Figure 1:
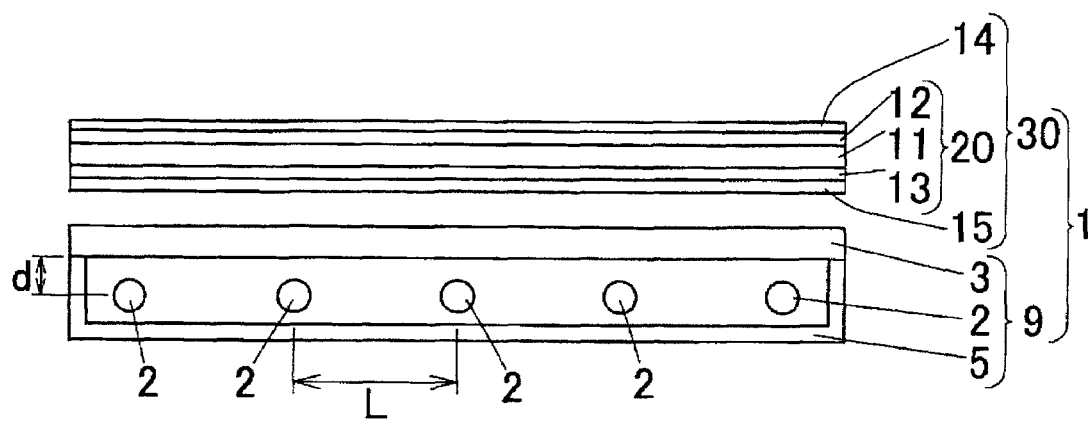
FIG. 1 is a schematic side view showing one embodiment of a liquid crystal display device of the present invention.

1: Liquid crystal display device
2: Light source
3: Light diffuser plate
9: Surface emission light source
11: Liquid crystal
12: Transparent electrode
13: Transparent electrode
20: Liquid crystal cell
30: Liquid crystal panel

DETAILED DESCRIPTION OF THE INVENTION

One embodiment of the liquid crystal display device (1) according to the present invention is shown in FIG. 1. The liquid crystal display device (1) comprises a surface emission light source (9) and a liquid crystal panel (30) disposed on the front side of the surface emission light source (9).

The liquid crystal panel (30) comprises a liquid crystal cell (20) constituted by interposing a liquid crystal (11) between a pair of transparent electrodes (12) and (13) disposed in parallel one above the other at a distance from each other, and polarizer plates (14), (15) placed on both sides of the liquid crystal cell (20). These components (11), (12), (13), (14) and (15) constitute a display section. An alignment film (not shown) is laminated on the inner surface (facing the liquid crystal) of each of the transparent electrodes (12) and (13).

Molecules of the liquid crystal (11) are aligned in a direction substantially perpendicular to the pair of transparent electrodes (12), (13) (including the exactly perpendicular direction) when no voltage is applied across the pair of transparent electrodes (12), (13), and are aligned in a direction substantially parallel with the pair of transparent electrodes (12), (13) (including the exactly parallel direction) when a voltage is applied across the pair of transparent electrodes (12), (13). In other words, a vertical alignment liquid crystal cell is used as the liquid crystal cell (20).

The surface emission light source (9) is disposed on the side of the lower surface (back side) of the lower polarizer plate (15). The surface emission light source (9) comprises a lamp box (5) having a shallow box constitution of rectangular shape in plan view with the top side (front side) left open, a plurality of light sources (2) disposed apart from each other in the lamp box (5) and the light diffuser plate (3) disposed above (on the frontside of) the plurality of light sources (2). The light diffuser plate (3) is secured onto the lamp box (5) so as to close the opening thereof. A light reflector layer (not shown) is provided on the inner surface of the lamp box (5).

The light diffuser plate (3) is a plate-shaped member formed from a transparent material including light diffusing particles dispersed therein.

The light diffuser plate (3) is constituted so that the absolute value of a difference $\Delta n$ in the refractive index between the transparent material and the light diffusing particles and a 50% cumulative particle diameter $D_{50}$ (μm) of the light diffusing particles satisfy the relation $0.01 \leq \Delta n \times D_{50} \leq 0.25$ or $0.61 \leq \Delta n \times D_{50} \leq 0.75$. The transparent material and the light diffusing particles that satisfy the relation constitute the light diffuser plate (3).

In the VA type liquid crystal display device (1) having the constitution described above, diffused light that has transmitted through the light diffuser plate (3) in an oblique direction is tinged with bluish color since the light diffuser plate (3) satisfies the relation $0.01 \leq \Delta n \times D_{50} \leq 0.25$ or $0.61 \leq \Delta n \times D_{50} \leq 0.75$. This bluish color shift and the reddish color shift that occurs when this light is then transmitted obliquely through the liquid crystal panel (30) cancel each other. As a result, natural color display of high quality can be achieved without reddish color shift, when the liquid crystal panel (30) is viewed obliquely. Since the diffused light that has transmitted through the light diffuser plate (3) having the constitution described above in the normal direction is white light, natural color display of high quality can be achieved when the liquid crystal panel (30) is also viewed in the normal direction.

When the relation $\Delta n \times D_{50} < 0.01$ or $0.25 < \Delta n \times D_{50} < 0.61$ or $0.75 < \Delta n \times D_{50}$ is satisfied, diffused light that has transmitted through the light diffuser plate in an oblique direction is tinged insufficiently with bluish color or is ordinary white light which is not tinged with bluish color at all, thus the liquid crystal display device shows color pictures tinged with reddish color when viewed in an oblique direction.

The light diffuser plate (3) is not specifically limited so long as it is a plate-shaped member formed from a transparent material including light diffusing particles dispersed therein, and any light diffuser plate can be used.

The transparent material is not specifically limited and includes, for example, glass and a transparent resin. Examples of the transparent resin include a polycarbonate resin, an ABS resin (an acrylonitrile-styrene-butadiene copolymer resin), a methacryl resin, a MS resin (a methyl methacrylate-styrene copolymer resin), a polystyrene resin, an AS resin (an acrylonitrile-styrene copolymer resin), and a polyolefin resin (for example, polyethylene or polypropylene).

The light diffusing particles (light diffuser) are not specifically limited so long as they are particles that have a refractive index different from that of the transparent material that constitutes the light diffuser plate (3), and can diffuse transmitted light, and any light diffusing particles can be used. Examples thereof include inorganic particles such as glass beads, silica particles, aluminum hydroxide particles, calcium carbonate particles, barium sulfate particles, titanium oxide particles, and talc; and resin particles such as styrenic polymer particles, acrylic polymer particles, and siloxane-based polymer particles.

The amount of the light diffusing particles to be added is preferably adjusted within a range from 0.01 to 20 parts by mass based on 100 parts by mass of the transparent material. Ensuring that the amount is 0.01 parts by mass or more enables a sufficient light diffusing function to be achieved, whereas ensuring that the amount is 20 parts by mass or less enables diffused light that has transmitted through the light diffuser plate in an oblique direction to be prevented from being tinged insufficiently with bluish color.

A 50% cumulative particle diameter ($D_{50}$) of the light diffusing particles is usually 10 μm or less, and preferably from 0.3 to 8 μm.

The absolute value of a difference $\Delta n$ in the refractive index between the transparent material and the light diffusing particles is usually adjusted within a range from 0.01 to 0.20, and preferably from 0.02 to 0.18.

The light diffuser plate (3) may contain various additives such as ultraviolet absorbers, heat stabilizers, antioxidants, weather resistance agents, photostabilizers, fluorescent whitening agents and processing stablizers. It is also possible to add light diffusing particles other than the light diffusing particles that satisfy the above specific relation so long as the effect of the present invention is not adversely affected.

The thickness of the light diffuser plate (3) is not specifically limited, but is usually from 0.1 to 15 mm, preferably from 0.5 to 10 mm, and more preferably from 1 to 5 mm.

A coating layer may be formed on the surface of the light diffuser plate (3) so long as the effect of the present invention is not adversely affected. The thickness of the coating layer is preferably adjusted to 20% or less of the thickness of the light diffuser plate (3), and particularly preferably 10% or less of the thickness of the light diffuser plate (3).

As the method for producing the light diffuser plate (3), a molding method known as a method for molding a resin plate can be used, and examples thereof include, but are not limited to, a heat press method, a melt extrusion method and an injection molding method.

Examples of the material of the transparent electrodes (12), (13) include, but are not limited to, ITO (indium tin oxide).

Examples of the light source (2) include, but are not limited to, a fluorescent tube, a halogen lamp, a tungsten lamp, and a light emitting diode.

The distance (L) between adjacent light sources (2), (2) is preferably adjusted to 10 mm or more in view of power saving, and the distance (d) between the light diffuser plate (3) and the light source (2) is preferably adjusted to 50 mm or less in view of thickness reduction. Also, a ratio d:L is preferably from 1:5 to 5:1. It is more preferred that the distance (L) between adjacent light sources (2) (2) is adjusted within a range from 10 to 100 mm. It is particularly preferred that the distance (d) between the light diffuser plate (3) and the light source (2) is adjusted within a range from 10 to 50 mm.

The liquid crystal display device (1) of the present invention is not limited to the above embodiments, and various design variations made in accordance with the purports described hereinbefore and hereinafter are also included in the technical scope of the present invention.

EXAMPLES

Specific Examples of the present invention will now be described, but the present invention is not limited to the following Examples.

Example 1

100 parts by mass of a polystyrene resin and 0.1 parts by mass of silicone resin particles ("XC99-A8808" manufactured by Shin-Etsu Chemical Co., Ltd.) (light diffusing particles) were mixed using a Henschel mixer, and then the mixture was melt-kneaded and extruded using an extruder to produce a light diffuser plate (3) having a thickness of 2 mm. The refractive index of the polystyrene resin was 1.59 and that of the silicone resin particles was 1.43. The absolute value of a difference ($\Delta n$) in both was 0.16. Also, the 50% cumulative particle diameter ($D_{50}$) of the silicone resin particles was 0.6 (μm). Then, a VA type liquid crystal display device (1) with the constitution shown in FIG. 1 was produced using the light diffuser plate (3). As a light source (2), a fluorescent tube was used.

Example 2

100 parts by mass of a polystyrene resin and 1.0 parts by mass of acryl resin particles ("Tecpolymer BMX-2H" manufactured by Sekisui Chemical Co., Ltd.) (light diffusing particles) were mixed using a Henschel mixer, and then the mixture was melt-kneaded and extruded using an extruder to produce a light diffuser plate (3) having a thickness of 2 mm. The refractive index of the polystyrene resin was 1.59 and that of the acryl resin particles was 1.49. The absolute value of a difference ($\Delta n$) in both was 0.10. Also, the 50% cumulative particle diameter ($D_{50}$) of the acryl resin particles was 2.3 (μm). Then, a VA type liquid crystal display device (1) with the constitution shown in FIG. 1 was produced using the light diffuser plate (3). As a light source (2), a fluorescent tube was used.

Example 3

100 parts by mass of a polystyrene resin and 0.5 parts by mass of silicone resin particles ("Tospearl 145" manufactured by Toshiba Silicone Co., Ltd.) (light diffusing particles) were mixed using a Henschel mixer, and then the mixture was melt-kneaded and extruded using an extruder to produce a light diffuser plate (3) having a thickness of 2 mm. The refractive index of the polystyrene resin was 1.59 and that of the silicone resin particles was 1.43. The absolute value of a difference ($\Delta n$) in both was 0.16. Also, the 50% cumulative particle diameter ($D_{50}$) of the silicone resin particles was 3.9 (μm). Then, a VA type liquid crystal display device (1) with the constitution shown in FIG. 1 was produced using the light diffuser plate (3). As a light source (2), a fluorescent tube was used.

Comparative Example 1

100 parts by mass of a polystyrene resin and 0.3 parts by mass of silicone resin particles ("Tospearl 120" manufactured by Toshiba Silicone Co., Ltd.) (light diffusing particles) were mixed using a Henschel mixer, and then the mixture was melt-kneaded and extruded using an extruder to produce a light diffuser plate (3) having a thickness of 2 mm. The refractive index of the polystyrene resin was 1.59 and that of the silicone resin particles was 1.43. The absolute value of a difference ($\Delta n$) in both was 0.16. Also, the 50% cumulative particle diameter ($D_{50}$) of the silicone resin particles was 1.7 (μm). Then, a VA type liquid crystal display device (1) with the constitution shown in FIG. 1 was produced using the light diffuser plate (3). As a light source (2), a fluorescent tube was used.

Comparative Example 2

100 parts by mass of a polystyrene resin and 1.2 parts by mass of acryl resin particles ("Tecpolymer MBX-5" manufactured by Sekisui Chemical Co., Ltd.) (light diffusing particles) were mixed using a Henschel mixer, and then the mixture was melt-kneaded and extruded using an extruder to produce a light diffuser plate (3) having a thickness of 2 mm. The refractive index of the polystyrene resin was 1.59 and that of the acryl resin particles was 1.49. The absolute value of a difference ($\Delta n$) in both was 0.10. Also, the 50% cumulative particle diameter ($D_{50}$) of the acryl resin particles was 4.2 (μm). Then, a VA type liquid crystal display device (1) with the constitution shown in FIG. 1 was produced using the light diffuser plate (3). As a light source (2), a fluorescent tube was used.

Comparative Example 3

100 parts by mass of a polystyrene resin and 2.0 parts by mass of acryl resin particles ("Tecpolymer MBX-8" manufactured by Sekisui Chemical Co., Ltd.) (light diffusing particles) were mixed using a Henschel mixer, and then the mixture was melt-kneaded and extruded using an extruder to produce a light diffuser plate (3) having a thickness of 2 mm. The refractive index of the polystyrene resin was 1.59 and that of the acryl resin particles was 1.49. The absolute value of a difference ($\Delta n$) in both was 0.10. Also, the 50% cumulative particle diameter ($D_{50}$) of the acryl resin particles was 6.0 (μm). Then, a VA type liquid crystal display device (1) with the constitution shown in FIG. 1 was produced using the light diffuser plate (3). As a light source (2), a fluorescent tube was used.

Comparative Example 4

100 parts by mass of a polystyrene resin and 0.8 parts by mass of silicone resin particles ("Tospearl 3120" manufactured by Toshiba Silicone Co., Ltd.) (light diffusing particles) were mixed using a Henschel mixer, and then the mixture was melt-kneaded and extruded using an extruder to produce a light diffuser plate (3) having a thickness of 2 mm. The refractive index of the polystyrene resin was 1.59 and that of the silicone resin particles was 1.43. The absolute value of a difference ($\Delta n$) in both was 0.16. Also, the 50% cumulative particle diameter ($D_{50}$) of the silicone resin particles was 6.4 (μm). Then, a VA type liquid crystal display device (1) with the constitution shown in FIG. 1 was produced using the light diffuser plate (3). As a light source (2), a fluorescent tube was used.

<Method for Measurement of 50% Cumulative Particle Diameter of Light Diffusing Particles>

The 50% cumulative particle diameter ($D_{50}$) was measured by a Fraunhofer diffraction method of forward scatter lighting of a laser light source using a microtrac particle diameter analyzer (Model 9220FRA) manufactured by NIKKISO Co., Ltd. Upon measurement, light diffusing particles (about 0.1 g) were dispersed in methanol to obtain a dispersion solution. The dispersion solution was irradiated with supersonic waves for 5 minutes and the dispersion solution was charged through a sample inlet of the microtrac particle diameter analyzer, followed by measurement. 50% cumulative particle diameter ($D_{50}$) means a particle diameter of particles determined as follows. That is, a particle diameter and a volume of entire particles are measured and the volume is sequentially multiplicated from particles having a small particle diameter, and then the particle diameter of particles in which the multiplicated volume accounts for 50% of the total volume of the entire particles is determined.

Each of the liquid display devices thus obtained was evaluated according to the following evaluation methods. The results are shown in Table 1.

TABLE 1

| | Constitution of light diffuser plate | | | | | Evaluation of color shift of image | |
|---|---|---|---|---|---|---|---|
| | Refractive index of resin | Refractive index of light diffusing particles | Δn | $D_{50}$ (μm) | Δn × $D_{50}$ | Normal direction | Oblique direction |
| Example 1 | 1.59 | 1.43 | 0.16 | 0.6 | 0.10 | A | A |
| Example 2 | 1.59 | 1.49 | 0.10 | 2.3 | 0.23 | A | A |
| Comparative Example 1 | 1.59 | 1.43 | 0.16 | 1.7 | 0.27 | A | C |
| Comparative Example 2 | 1.59 | 1.49 | 0.10 | 4.2 | 0.42 | A | C |
| Comparative Example 3 | 1.59 | 1.49 | 0.10 | 6.0 | 0.60 | A | C |
| Example 3 | 1.59 | 1.43 | 0.16 | 3.9 | 0.62 | A | A |
| Comparative Example 4 | 1.59 | 1.43 | 0.16 | 6.4 | 1.02 | A | C |

<Method for Evaluation of Color Shift in Normal Direction>

With respect to each of the liquid crystal display devices, a liquid crystal image was visually observed in the normal direction in a state of being illuminated by the light source, and then color shift of the visually observed image was examined. Liquid crystal display devices in which natural color display is realized were rated "Good (A)", those with slight reddish color shift were rated "Ordinary (B)", and those with drastic reddish color shift were rated "Poor (C)", respectively.

<Method for Evaluation of Color Shift in Oblique Direction>

With respect to each of the liquid crystal display devices, a liquid crystal image was visually observed in an oblique direction of 45° in a state of being illuminated by the light source, and then color shift of the visually observed image was examined. Liquid crystal display devices in which natural color display is realized were rated "Good (A)", those with slight reddish color shift were rated "Ordinary (B)", and those with drastic reddish color shift were rated "Poor (C)", respectively.

As is apparent from Table 1, the liquid crystal display devices of Examples 1 to 3 of the present invention could achieve natural color display of high quality without reddish color shift, not only when viewed in the normal direction but also when viewed obliquely.

In contrast, the liquid crystal display devices of Comparative Examples 1 to 4, which depart from the scope defined in the present invention, achieved natural color display when viewed in the normal direction, but showed color display with reddish color shift when viewed obliquely.

What is claimed is:

1. A liquid crystal display device comprising a light diffuser plate, a light source disposed on the back side of the light diffuser plate, and a liquid crystal panel disposed on the front side of the light diffuser plate, wherein
the liquid crystal panel has a liquid crystal cell constituted by interposing a liquid crystal between a pair of transparent electrodes that are disposed at a distance from each other, and the liquid crystal molecules are aligned in a direction substantially perpendicular to the transparent electrodes when no voltage is applied across the pair of transparent electrodes,
the light diffuser plate is constituted by dispersing light diffusing particles in a transparent material, and
an absolute value of a difference Δn in a refractive index between the transparent material and the light diffusing particles and a 50% cumulative particle diameter $D_{50}$ (μm) of the light diffusing particles satisfy a relation $0.01 \leq \Delta n \times D_{50} \leq 0.25$.

2. A liquid crystal display device comprising a light diffuser plate, a light source disposed on the back side of the light diffuser plate, and a liquid crystal panel disposed on the front side of the light diffuser plate, wherein
the liquid crystal panel has a liquid crystal cell constituted by interposing a liquid crystal between a pair of transparent electrodes that are disposed at a distance from each other, and the liquid crystal molecules are aligned in a direction substantially perpendicular to the transparent electrodes when no voltage is applied across the pair of transparent electrodes,
the light diffuser plate is constituted by dispersing light diffusing particles in a transparent material, and
an absolute value of a difference Δn in a refractive index between the transparent material and the light diffusing particles and a 50% cumulative particle diameter $D_{50}$ (μm) of the light diffusing particles satisfy a relation $0.61 \leq \Delta n \times D_{50} \leq 0.75$.

* * * * *